United States Patent Office 2,991,318
Patented July 4, 1961

2,991,318
NEW ORGANIC COMPOUNDS
Thomas Leigh, Alderley Park, Macclesfield, England, assignor to Imperial Chemical Industries Limited, London, England, a corporation of Great Britain
No Drawing. Filed Apr. 6, 1959, Ser. No. 804,128
Claims priority, application Great Britain Apr. 25, 1958
12 Claims. (Cl. 260—666)

This invention relates to new organic compounds and more particularly it relates to tert.-alkylcyclopentadienes which are useful as intermediates in the preparation of ferrocene derivatives which are valuable as haematinics for the treatment of iron deficiency anaemia in man and animals.

According to the invention we provide tert.-alkylcyclopentadienes of the formula:

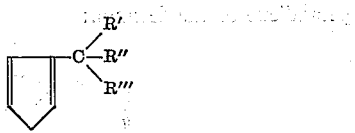

wherein R', R" and R''' stand for alkyl radicals.

A preferred group of compounds of the said formula is that wherein R', R" and R''' stand for alkyl radicals each containing up to 8 carbon atoms and a further preferred group of compounds of the said formula is that wherein the radicals R', R" and R''' together contain not more than 8 carbon atoms.

Particularly useful compounds are tert.-butylcyclopentadiene, tert.-amylcyclopentadiene and (1-methyl-1-ethylpropyl)cyclopentadiene.

According to a further feature of the invention we provide a process for the manufacture of the said compounds which comprises interaction of either a cyclopentadienyl magnesium halide or a cyclopentadienyl zinc halide and a tert.-alkyl halide, for example tert.-butyl chloride, tert.-amyl chloride or 3-chloro-3-methylpentane.

A suitable cyclopentadienyl magnesium halide may be for example cyclopentadienyl magnesium bromide and the process may be carried out in the presence of an inert diluent or solvent for example diethyl ether or di-n-butyl ether.

The cyclopentadienyl magnesium halides used as starting material may be obtained by known means for example by interaction of cyclopentadiene and an alkyl magnesium halide such as methyl magnesium iodide or ethyl magnesium bromide.

A suitable cyclopentadienyl zinc halide may be, for example cyclopentadienyl zinc chloride, and the process may be carried out in the presence of one or more inert diluents or solvents, for example diethyl ether or tetrahydrofuran.

The cyclopentadienyl zinc halides used as starting material may be obtained by known means, for example by the interaction of cyclopentadienyl sodium with the appropriate zinc halide.

According to a further feature of the invention we provide a process for the manufacture of the said new compounds which comprises interaction of a dicyclopentadienyl derivative of the formula:

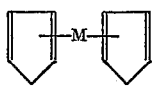

wherein M stands for magnesium or manganese, and a tert.-alkyl halide, for example tert.-butyl chloride, tert.-amyl chloride or 3-chloro-3-methylpentane.

The process may be carried out in the presence of an inert diluent or solvent for example tetrahydrofuran.

The dicyclopentadienyl magnesium or manganese used as starting material may be obtained by reacting cyclopentadienyl sodium with the appropriate metal halide such as magnesium chloride or manganous bromide.

The invention is illustrated but not limited by the following examples in which the parts are by weight:

Example 1

A solution of 546 parts of ethyl bromide in 800 parts of diethyl ether is added to a stirred suspension of 120 parts of magnesium turnings and 80 parts of diethyl ether during two hours. The mixture is stirred for a further one hour. 264 parts of cyclopentadiene are then added to the mixture over one hour and after stirring for a further 24 hours, 556 parts of tert.-butyl chloride are added during 90 minutes. The reaction mixture is stirred for twenty-four hours and is then poured on to 5,000 parts of crushed ice. The ethereal layer is separated and is washed with water and dried over anhydrous sodium sulphate. The ether is removed at reduced pressure and the residue is distilled and there is obtained tert.-butylcyclopentadiene, B.P. 45° C./28 mm.

Example 2

70 parts of cyclopentadiene are added during one hour to a suspension of 23 parts of finely divided sodium in 200 parts of tetrahydrofuran in an atmosphere of nitrogen and at a temperature of 25–30° C. The mixture is stirred during a further two hours. 100 parts of anhydrous manganous bromide are added during 30 minutes and the mixture is then stirred at 60° C. during 90 minutes. The mixture is cooled to 25° C. and 92 parts of tert.-butyl chloride are added during 30 minutes. The mixture is heated to 50° C. and stirred during a further 90 minutes at this temperature. It is then cooled to 25° C. and 100 parts of petroleum ether (B.P. 40–60° C.) are added. The mixture is poured into water and the petroleum ether layer is separated, washed with water and dried over anhydrous sodium sulphate. The petroleum ether is removed at reduced pressure and the residue is fractionally distilled under reduced pressure. There is thus obtained tert.-butylcyclopentadiene, B.P. 45° C./28 mm.

Example 3

The process described in Example 2 is repeated except that the 100 parts of anhydrous manganous bromide are replaced by 40 parts of anhydrous magnesium chloride. There is thus obtained in similar manner tert.-butylcyclopentadiene, B.P. 45° C./28 mm.

Example 4

The process described in Example 1 is repeated except that 556 parts of tert.-butyl chloride are replaced by 640 parts of tert.-amyl chloride. There is thus obtained tert.-amylcyclopentadiene, B.P. 51° C./5 mm.

Example 5

The process described in Example 1 is repeated except that 556 parts of tert.-butyl chloride are replaced by 895 parts of 2-chloro-2:4:4-trimethylpentane. There is thus obtained (1:1:3:3-tetramethylbutyl)cyclopentadiene, B.P. 35° C./0.1 mm.

Example 6

The process described in Example 1 is repeated except that 556 parts of tert.-butyl chloride are replaced by 725 parts of 3-chloro-3-methylpentane. There is thus obtained (1-methyl-1-ethylpropyl)cyclopentadiene, B.P. 38° C./4 mm.

Example 7

The process described in Example 1 is repeated except that 556 parts of tert.-butyl chloride are replaced by 725 parts of 2-chloro-2-methylpentane. There is thus obtained (1:1-dimethylbutyl)cyclopentadiene, B.P. 25° C./0.5 mm.

*Example 8*

70 parts of cyclopentadiene are added during 1 hour to a suspension of 23 parts of finely divided sodium in 200 parts of tetrahydrofuran in an atmosphere of nitrogen and at a temperature of 25–30° C. The mixture is stirred during a further 2 hours and is then added during 1 hour to a stirred suspension of 136 parts of powdered anhydrous zinc chloride in 300 parts of ether at 25–30° C. The mixture is then stirred during 3 hours. 92.5 parts of tert.-butyl chloride are added during 30 minutes at 25–30° C. and the mixture is stirred during a further 90 minutes. The mixture is then poured into water and the ethereal layer is separated, washed with water and dried over anhydrous sodium sulphate. The ether is removed at reduced pressure and the residue is fractionally distilled under reduced pressure. There is thus obtained tert.-butylcyclopentadiene, B.P. 45° C./28 mm.

*Example 9*

The process described in Example 1 is repeated except that 556 parts of tert.-butyl chloride are replaced by 895 parts of 3-chloro-3-methylheptane. There is thus obtained (1-methyl-1-ethylamyl)cyclopentadiene, B.P. 40° C./0.5 mm.

What I claim is:

1. A tert-alkylcyclopentadiene of the formula:

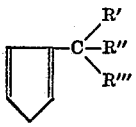

wherein R', R" and R'" are alkyl radicals each containing up to eight carbon atoms, the radicals R', R" and R'" together containing not more than eight carbon atoms.

2. A compound selected from the group consisting of tert.-butylcyclopentadiene, tert.-amylcyclopentadiene, (1:1-dimethylbutyl)cyclopentadiene, and (1-methyl-1-ethylpropyl)cyclopentadiene.

3. A process for the manufacture of a tert.-alkylcyclopentadiene of the formula:

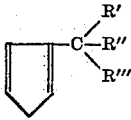

wherein R', R" and R'" are alkyl radicals, each containing up to eight carbon atoms, the radicals R', R" and R'" together containing not more than eight carbon atoms, which comprises reacting a cyclo compound selected from the group consisting of cyclopentadienyl magnesium halide and cyclopentadienyl zinc halide, and a tert.-alkyl halide.

4. A process as claimed in claim 3 wherein the tert.-alkyl halide is selected from the group consisting of tert.-butyl chloride, tert.-amyl chloride and 3-chloro-3-methylpentane.

5. A process as claimed in claim 3 wherein the cyclo compound is cyclopentadienyl magnesium bromide.

6. A process as claimed in claim 3 which is carried out in the presence of an inert liquid medium.

7. A process as claimed in claim 6 wherein the inert medium is selected from the group consisting of diethyl ether, tetrahydrofuran and di-n-butyl ether.

8. A process as claimed in claim 3 wherein the cyclo compound is cyclopentadienyl zinc chloride.

9. A process for the manufacture of a tert.-alkylcyclopentadiene of the formula:

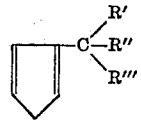

wherein R', R" and R'" are alkyl radicals, each containing up to eight carbon atoms, the radicals R', R" and R'" together containing not more than eight carbon atoms, which comprises reacting a dicyclopentadienyl derivative of the formula:

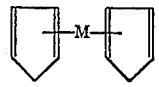

wherein M stands for a metal selected from the group consisting of magnesium and manganese, and a tert.-alkyl halide.

10. A process as claimed in claim 9 wherein the tert.-alkyl halide is selected from the group consisting of tert.-butyl chloride, tert.-amyl chloride and 3-chloro-3-methylpentane.

11. A process as claimed in claim 9 which is carried out in the presence of an inert liquid medium.

12. A process as claimed in claim 11 wherein the inert liquid medium is tetrahydrofuran.

References Cited in the file of this patent

Treibs et al.: Chemical Abstracts, volume 27, 1933, page 34654.